United States Patent [19]
Coleman et al.

[11] Patent Number: 5,969,847
[45] Date of Patent: Oct. 19, 1999

[54] METHOD FOR SEALING A LAMINATED ELECTROCHROMIC DEVICE EDGE

[75] Inventors: Charles R. Coleman; Phillip C. Yu, both of Pittsburgh; David L. Backfisch, Monroeville, all of Pa.

[73] Assignee: PPG Industries Ohio, Inc., Cleveland, Ohio

[21] Appl. No.: 08/995,788

[22] Filed: Dec. 22, 1997

[51] Int. Cl.⁶ .............................. B02F 1/15; B02F 1/161; B29D 11/00
[52] U.S. Cl. .......................... 359/265; 359/273; 359/274; 264/1.7
[58] Field of Search .................... 359/265–275; 264/1.1, 1.7

[56] References Cited

U.S. PATENT DOCUMENTS

| | | | |
|---|---|---|---|
| 4,174,152 | 11/1979 | Giglia et al. | 350/357 |
| 4,275,494 | 6/1981 | Masaharu et al. | 592/592 R |
| 4,335,938 | 6/1982 | Giglia et al. | 350/357 |
| 4,361,385 | 11/1982 | Huang et al. | 350/357 |
| 4,478,991 | 10/1984 | Huang et al. | 526/287 |
| 4,554,318 | 11/1985 | Rukavina | 525/118 |
| 4,609,703 | 9/1986 | Rukavina | 524/360 |
| 4,670,350 | 6/1987 | Rukavina | 428/520 |
| 5,288,381 | 2/1994 | Cogan et al. | 204/192.26 |
| 5,327,281 | 7/1994 | Cogan et al. | 359/270 |
| 5,433,810 | 7/1995 | Abrams | 156/273.7 |
| 5,442,478 | 8/1995 | Lampert et al. | 359/273 |
| 5,471,338 | 11/1995 | Yu et al. | 359/273 |
| 5,618,390 | 4/1997 | Yu et al. | 204/192.26 |
| 5,657,150 | 8/1997 | Kallman et al. | 359/275 |
| 5,856,211 | 1/1999 | Tonazzi et al. | 438/69 |

OTHER PUBLICATIONS

Copending U.S. Patent Application Serial No. 08/970,031 entitled, "Suspension Lamination Method and Device", filed Nov. 13, 1997, by C. R. Coleman et al.

*Primary Examiner*—Georgia Epps
*Assistant Examiner*—Margaret Burke
*Attorney, Agent, or Firm*—William C. Mitchell

[57] ABSTRACT

A method for sealing the circumferential edge region of a laminated electrochromic device is disclosed. The method involves cutting a circumferential groove into the edge region of the device at the ion-conducting interface of its substrates. Sealant is then applied to the groove. Sealed devices are also disclosed.

23 Claims, 1 Drawing Sheet

METHOD FOR SEALING A LAMINATED ELECTROCHROMIC DEVICE EDGE

FIELD OF THE INVENTION

The instant invention is generally concerned with a technique for sealing the circumferential edge region or surface of a laminated electrochromic device and with the resulting sealed device.

More particularly, this invention involves sealing the circumferential edge region of a laminated electrochromic device, such as an electrochromic lens, by forming a circumferential groove in the edge surface to be sealed, and applying a sealant to the groove. The groove is aligned with the portion or layer of the laminated edge surface prone to moisture loss or gain, such as an ion-conducting material layer. In the case of an electrochromic lens, this method enables an edge surface comprising an ion-conducting material layer to be sealed. The edge seal is also believed to improve the structural integrity of the sealed device, thereby helping to prevent delamination.

BACKGROUND OF THE ART

The optical properties of electrochromic materials change in response to electrically driven changes in oxidation state. Thus, when an applied voltage from an external power supply causes electrons to flow to (reduction) or from (oxidation) an electrochromic material, its transmittance properties change. In order to maintain charge neutrality, a charge balancing flow of ions in the electrochromic device is needed. By enabling the required electron and ion flows to occur, an electrochromic device utilizes reversible oxidation and reduction reactions to achieve optical switching.

Conventional electrochromic devices comprise at least one thin film of a persistent electrochromic material, i.e. a material which, in response to application of an electric field of given polarity, changes from a high-transmittance, non-absorbing state to a low-transmittance, absorbing or reflecting state. Since the degree of optical modulation is directly proportional to the current flow induced by the applied voltage, electrochromic devices demonstrate light transmission tunability between high-transmittance and low-transmittance states. In addition, these devices exhibit long-term retention of a chosen optical state, requiring no power consumption to maintain that optical state. Optical switching occurs when an electric field of reversed polarity is applied.

To facilitate the aforementioned ion and electron flows, an electrochromic film which is both an ionic and electronic conductor is in ion-conductive contact, preferably direct physical contact, with an ion-conducting material layer. The ion-conducting material may be inorganic or organic, solid, liquid or gel, and is preferably an organic polymer. The electrochromic film(s) and ion-conductive material are disposed between two electrodes, forming a laminated cell.

When the electrode adjacent to the electrochromic film is the cathode, application of an electric field causes darkening of the film. Reversing the polarity causes electrochromic switching, and the film reverts to its high-transmittance state. Typically, an electrochromic film such as tungsten oxide is deposited on a substrate coated with an electroconductive film such as tin oxide or indium tin oxide to form one electrode. The counter electrode is typically a similar tin oxide or indium tin oxide coated substrate.

As voltage is applied across the electrodes, ions are conducted through the ion-conducting material. To ensure reliable operation, the ion-conducting material layer generally must be sealed so as to maintain its water content within a range sufficient to provide required ion conductivity. Absent an adequate seal, moisture loss or gain through the exposed edge of the ion-conducting material layer will impact performance.

The instant invention addresses this need. Also, in the case of electrochromic lenses, the instant edge seal generally imparts strength to the laminate without adversely impacting attachment of the lens to an eyewear frame.

U.S. Pat. No. 4,174,152 to Giglia, et al., discloses electrochromic devices wherein the polymeric electrolyte material is a hydrophilic copolymer of a selected acrylate or methacrylate monomer and a selected acid group containing a monomer, such as 2-acrylamido-2-methylpropanesulfonic acid.

U.S. Pat. No. 4,335,938 to Giglia discloses electrochromic devices having a layer of tungsten oxide in contact with a layer of organic electrolyte resin comprising a hydrophilic layer of 2-acrylamido-2-methylpropanesulfonic acid homopolymer and an electrode means for changing electrochromic properties of the device.

U.S. Pat. No. 5,433,810 to Abrams discloses a method and device for bonding composite eyeglass lenses. This reference is silent regarding sealing the edges of composite lenses.

U.S. Pat. Nos. 4,361,385 and 4,478,991 to Huang, et al., disclose electrochromic devices having a layer of electrochromic tungsten oxide in contact with a polymeric electrolyte wherein the stability and speed of the device are improved by using a copolymer of 2-acrylamido-2-methylpropanesulfonic acid and vinyl sulfonic acid as the polymer electrolyte. The polymer mixture is cast, dried and hydrated in contact with the electrochromic film, and then a second electrode consisting of paper-carbon is pressed against the polymer layer with a second tin oxide-coated glass plate backing the carbon-paper electrode.

U.S. Pat. Nos. 4,554,318; 4,609,703 and 4,670,350 to Rukavina disclose copolymers of acrylic acid and cyanoethylacrylate, including terpolymers with hydroxyethylacrylate, useful as primers for bonding metal-containing coatings to organic polymer substrates.

U.S. Pat. No. 5,471,338 to Yu, et al., discloses lamination of two coated plastic substrates using a layer of polymer which bonds with both coated surfaces to form a composite. Homo and copolymers of 2-acrylamido-2-methyl propyl sulfonic acid (AMPSA) form the ion-conducting polymer layer and are cured using actinic radiation, preferably (UV) light. AMPSA/N,N-dimethylacrylamide (DMA) polymers are preferred, and benzoin methyl ether and diethoxyacetophenone are disclosed as UV initiators.

U.S. Pat. No. 5,288,381 to Cogan, et al., discloses a method for preparing electrooptical devices which relies upon $Li^+$ ion conducting polymers such as polyethylene oxide.

U.S. Pat. No. 5,327,281 to Cogan discloses the use of epoxy to seal a cavity formed when a spacer is used to separate electrodes and contain a liquid electrolyte injected between the spaced electrodes. This patent does not disclose or suggest edging an electrochromic device to form a circumferential groove on the edge to be sealed and applying a sealant to the groove.

U.S. Pat. No. 5,657,150 to Kallman et al., discloses an electrochromic device having an isolative barrier which electrically isolates the device electrodes.

SUMMARY OF THE INVENTION

This invention is directed to a method for edge-sealing a laminated electrochromic device, and is particularly useful when moisture loss or gain is critical to device performance. Thus, the instant method is useful in cases where the edge region to be sealed comprises a layer of an ion-conducting material such as an ion-conducting polymer (ICP). If, for example, a 2-acrylamido-2-methyl propyl sulfonic acid (AMPSA)-type polymer is disposed between substrates coated with electroconductive and electrochromic films to form a laminated electrochromic device, the edge region of the device will include the outer surface of the AMPSA-type polymer layer between the edge portions of the device substrates and will require sealing.

Through the instant method, the edge region (or a portion thereof) of a laminated electrochromic device is sealed by cutting a circumferential depression or groove into the edge region of the device. The groove is preferably formed by edging each of the mating edges of the two device halves so as to form a circumferential groove when the mating surfaces of these halves are joined. This technique aligns the groove with the circumferential interface of the device halves, which is the portion of the edge region containing the ion-conducting layer prone to moisture gain or loss. Sealant is then added to the groove and, if necessary, allowed to cure.

This method seals the edge, thereby impeding water loss from or gain into the electrochromic device. In the case of an article containing an ion-conducting polymer layer, the seal covers the ICP layer, which enables the water content of the ICP layer to be maintained within a suitable range. This in turn helps to maintain the required ion-mobility and the device's operability.

DETAILED DESCRIPTION OF THE INVENTION

Figure 1:
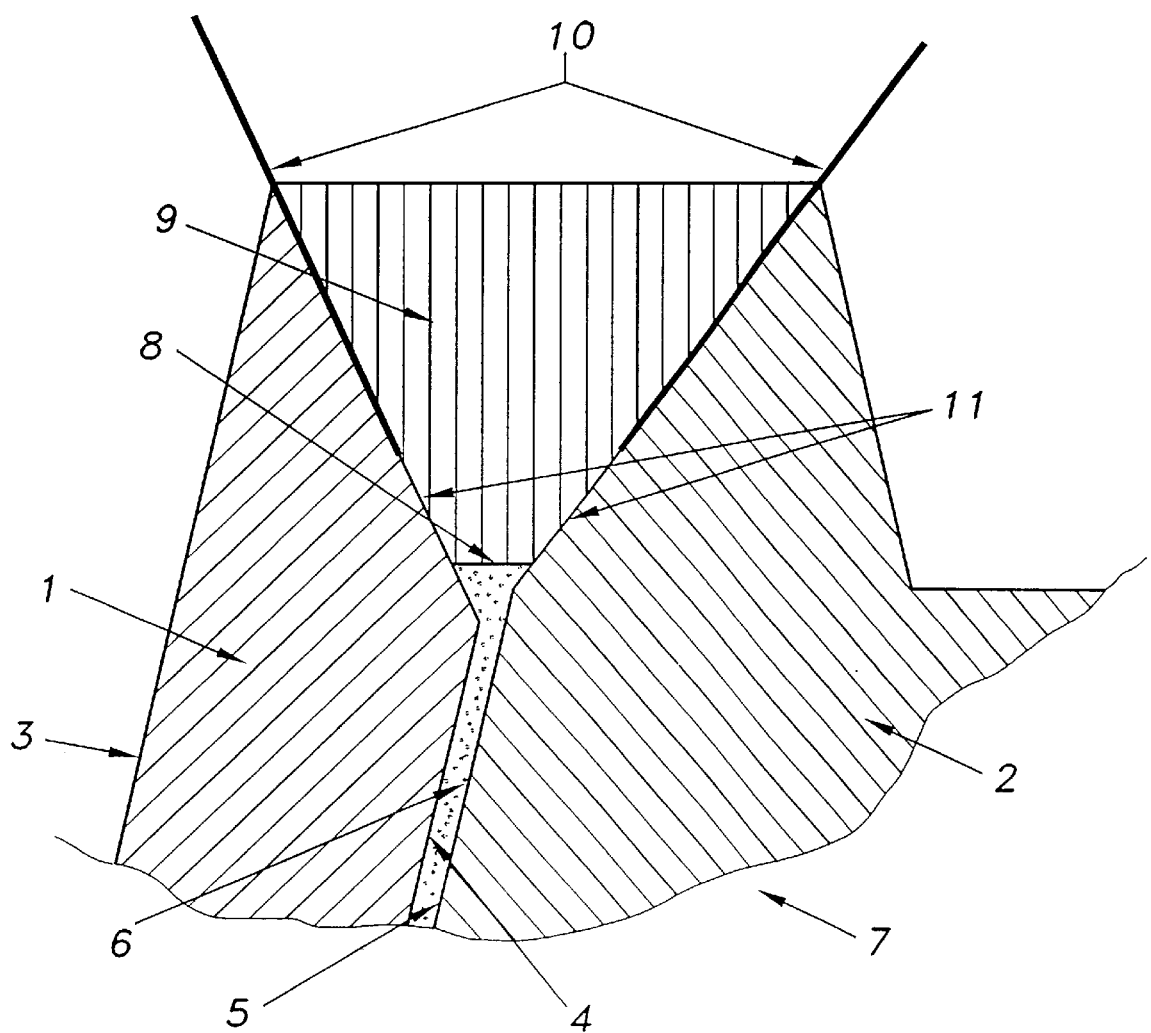
FIG. 1 is a cross-section of a laminated device showing the edge seal of the present invention.

The instant invention is directed to a method for sealing the circumferential edge region or surface of a laminated electrochromic device comprising first and second substrates, at least one of which is a coated substrate, and an ion-conducting material layer which is disposed between said first and second substrates at an interface, which method comprises: a) cutting a circumferential groove into said circumferential edge region; and b) applying a sealant to said groove; wherein said groove is aligned with said interface and wherein said sealant contacts and seals said ion-conducting material layer. If necessary, the method includes a step wherein the sealant is allowed to cure.

More particularly, the instant invention is directed to a method for sealing the circumferential edge region or portion thereof of a laminated electrochromic device, said edge region comprising outer surfaces of first and second substrate layers and an outer surface of an ion-conducting material layer, preferably an ion-conducting polymer (ICP) layer, wherein said ion-conducting material layer outer surface is situated between said first and second substrate layer outer surfaces and is prone to moisture gain or loss, which method comprises: a) cutting a circumferential groove into said edge region so as to locate the ion-conducting material layer outer surface within said groove, preferably at or near the bottom of said groove; and b) applying a sealant to said groove, thereby forming a sealed laminated electrochromic device. In the case of an electrochromic lens containing an ion-conducting polymer, the seal contacts the ICP layer on the circumferential edge surface of the lens, thereby impeding moisture ingress and egress.

Thus, a laminated electrochromic device which is generally but not necessarily shaped like a disk or lens and which has first and second expanse surfaces and a peripheral edge region or surface wherein the edges of the various layers comprising the laminate are exposed, is sealed by disposing a sealant into a groove cut into the peripheral edge region of the device at its ion-conducting material interface. The sealant adheres to the peripheral edge surfaces of device, which surfaces may or may not be coated, and contacts the ion-conducting material, resulting in an edge-sealed laminate.

The instant invention is further directed to edge-sealed laminated electrochromic devices prepared by the instant methods. More particularly, the instant invention is directed to a laminated electrochromic device comprising an ion-conducting material layer disposed between a first substrate and a second substrate, at least one of which is a coated substrate, said device having a circumferential edge region prone to moisture gain or loss, wherein said circumferential edge region contains a circumferential groove contiguous with said ion-conducting material layer and wherein said groove contains a sealant in contact with said ion-conducting material layer. Thus, the groove is located so as to place the exposed outer surface of the ion-conducting material layer within, preferably at or near the bottom of, the groove.

The instant invention is also directed to a laminated electrochromic lens comprising an ion-conducting polymer layer having an outer peripheral surface, wherein said ion-conducting polymer layer is disposed between a first coated lens and a second lens which may or may not be coated, said laminated electrochromic lens having an edge region prone to moisture gain or loss through the outer surface of said ion-conducting polymer layer, wherein said edge contains a circumferential groove positioned so as to locate the outer surface of said ion-conducting polymer layer within said groove and wherein said groove contains a sealant in contact with the outer surface of said ion-conducting polymer layer.

A key feature of the instant invention is that it helps to maintain the moisture content of ion-conducting materials within defined ranges, thereby enabling electrochromic devices prone to moisture loss or gain through their edges to be made more reliable.

As used herein, the term "groove" refers to any circumferential trough, depression, valley, etc., formed by shaping, molding, cutting or edging one or both of the substrates comprising the laminated electrochromic device to be sealed. Since the groove is located at the interface of the substrates, both substrates are preferably edged so as to form a symmetrical groove. However, a suitable groove can be formed by edging either one of the substrates, as will be apparent to persons skilled in the lens edging art. The sealant bonds to the surfaces of the substrates forming the groove and/or to the outer coating(s) on these substrates and contacts the surface of the ion-conducting material layer at or near the bottom of the groove. As indicated earlier, the groove is preferably made by edging each of the substrates so as to form matching inclined surfaces on each of the substrates. The groove is then formed when the mating surfaces of the substrates are bonded.

The depth of the groove is not believed to be critical. The groove should be of sufficient depth to adequately seal a given device. Generally, for lenses, groove depths can range from about 0.01 to about 0.25 inch (0.254 to about 0.625 mm). Depths may be much greater for larger electrochromic devices.

In the electrochromic devices of the instant invention, the beveled edges of the substrates forming the groove can serve as bus bar foundations. As used herein, the term 'bus bar' refers to a strip or band of a low resistance electrically conductive material that is in electrical contact with an electroconductive layer of an electrochromic device, generally around the periphery of the electroconductive layer. Bus bars can be applied to the surfaces of the instant grooves via conventional deposition techniques.

The laminated electrochromic devices of this invention contain an ion-conducting material layer disposed between mated first and second substrates. Various ion-conducting materials can be used, including for example, materials comprising hydrogen uranyl phosphate or polyethylene oxide/$LiClO_4$. Also, ion-conducting polymer electrolytes or inorganic films such as $LiNbO_3$, $LiBo_3$, $LiTaO_3$, $LiF$, $Ta_2O_5$, $Na_2AlF_6$, $Sb_2O_5$ $nH_2O+Sb_2O_3$, $Na_2O$ $11Al_2O_3$, $MgF_2$, $ZrO_2$, $Nb_2O_5$ and $Al_2O_3$ can be used as the ion-conducting material. Preferred ion-conducting materials are ion-conducting polymers; these polymers generally serve the dual functions of being ion-conducting electrolytes and mechanical adhesives. One class of suitable ion-conducting materials includes ion-containing polymers known as ionomers. These macromolecules contain ionizable groups covalently linked to a polymer chain, typically a hydrocarbon. Polystyrene sulfonic acid and poly (2-acrylamido-2-methyl-1-propanesulfonic acid) are examples of ionomers, both incorporating the protonic acid $SO_3H$ group on the polymer chain. Ionomers are generally formed by polymerizing monomers bearing both an ionizable group and an ethylenic, e.g. vinylic, group.

In accordance with a preferred embodiment of the present invention, the ion-conducting polymer electrolyte is a proton-conducting polymer selected from the group consisting of homopolymers of 2-acrylamido-2-methylpropanesulfonic acid (AMPSA) and copolymers of AMPSA with various monomers. Such polymers may be utilized in the form of preformed sheets which are laminated between the substrates, or in the form of liquid reaction mixtures of monomers which are cast and cured in place between the substrates. A preferred proton-conducting polymer electrolyte in accordance with the present invention is a copolymer of AMPSA and N,N-dimethylacrylamide (DMA), preferably cast and cured in place. More preferred copolymers of AMPSA and DMA are prepared from AMPSA and DMA monomers in a molar ratio range of about 1:3 to 1:2. The thickness of the polymer electrolyte is not believed to be critical but in general is in the range of 0.001 to 0.025 inch (0.0254 to 0.625 millimeter).

Cast-in-place methods of lamination are known in the art. A preferred method of lamination is the suspension lamination technique disclosed in copending U.S. patent application Ser. No. 08/970,031 to Coleman, Backfisch and Smarto, entitled "Suspension Lamination Method and Device" filed on Nov. 13, 1997. In this method, ion-conducting polymers are formed in situ between half cells of electrochromic devices by depositing a polymerizable monomer solution comprising one or more monomers and an initiator, and, optionally, one or more non-reactive diluents or additives, onto one of the half cells, distributing the monomer solution between the half cells, and exposing the initiator in the monomer solution to an energy source during suspension, thereby initiating suspension polymerization of the monomer solution. The monomer solution generally comprises a sufficient amount of a photoinitiator to polymerize the monomers upon exposure to actinic radiation.

The first and second substrates of the instant laminated electrochromic devices are generally glass or organic polymeric substrates conventionally used to prepare electrochromic articles or devices. Preferably, polymeric organic substrates are used. Substrates to which the sealing method of the present invention applies are preferably prepared from transparent materials suitable for producing eyewear lenses, such as lenses prepared from synthetic organic optical resins. Alternatively, the substrate can be a non-transparent solid material.

Suitable transparent lenses may have a conventional refractive index (1.48–1.5), a relatively high refractive index (1.60–1.75), or a mid-range refractive index (1.51–1.59), depending on the end use. In general terms, a transparent lens may have a refractive index within the range of between 1.48 and 1.75, e.g., from about 1.50 to about 1.8.

Synthetic polymer substrates that may be used as a lens material include, but are not limited to: thermoplastic polycarbonates, such as the carbonate-linked resin derived from bisphenol A and phosgene, which is sold under the trademark LEXAN®; polyesters, such as the material sold under the trademark, MYLAR®; poly (methylmethacrylates), such as the material sold under the trademark, PLEXIGLAS®; and polymerizates of a polyol (allyl carbonate) monomer, especially diethylene glycol bis(allyl carbonate), which is sold under the trademark CR-39®. Copolymers of the aforedescribed monomers/resins may also be used as a lens material. These and other transparent and non-transparent polymeric substrates known in the art for use for various optical and non-optical applications may be used.

The substrates of the instant method generally contain electroconductive films and at least one electrochromic film, i.e. a film of a persistent electrochromic material which in response to the application of an electric field of a given polarity and sufficient voltage changes from a high-transmittance, non-absorbing state to a lower-transmittance, absorbing or reflecting state. When an electric field of opposite polarity is applied to the electrochromic material, it switches back to a high-transmittance state. The electrochromic film, which is both an ionic and electronic conductor, is in ion-conductive contact, preferably direct physical contact, with the ion-conductive material.

The electrochromic film and ion-conducting material are disposed between two electrodes (i.e., electroconductive films) to form a cell. In some applications, a complementary electrochromic film is also present in the cell, while in other applications an optically passive film or metal is used in place of the complementary electrochromic film to form the cell.

Conventionally, in the preparation of electrochromic lenses, a cathodically coloring electrochromic material, usually tungsten oxide or compounds thereof, is deposited at a thickness of about 800 to 5,000 Angstroms on a transparent substrate that has been previously coated with an electroconductive metal oxide film, such as tin oxide or indium tin oxide (ITO), which electroconductive film serves as one electrode. Preferably, the electroconductive film comprises indium and tin at a weight ratio of about 90:10. The film thickness is preferably in the range of 800 to 4,000 Angstroms for acceptable conductivity. The electroconductive and electrochromic films may be deposited by a variety of methods so long as the substrate is not deleteriously affected. The adhesion of an electroconductive metal oxide film directly to a plastic substrate may be improved by application of a primer to said substrate prior to coating. See, for example, U.S. Pat. No. 5,471,338 to Yu, Backfisch and Rukavina.

In such lenses, the counter electrode is prepared by depositing a similar metal oxide coating on a second transparent substrate, with or without a complimentary electrochromic film. A suitable complimentary electrochromic film is a nitrogen-containing iridium oxide film as disclosed in U.S. Pat. No. 5,618,390, to Yu, Backfisch et al., which is incorporated herein by reference. The ion-conducting material is then disposed between substrates so coated; in the case of ion-conductive polymers, a precursor composition is generally cured or polymerized in situ by energy which passes through a substrate coated with an electroconductive film and/or an electrochromic film.

Thus, electrochromic eyeglass lenses are generally formed by bonding first and second lenses together, wherein each lens comprises a coated transparent substrate. Bonding is preferably accomplished by placing a curable ion-conducting polymer composition, i.e. a monomer solution containing one or more monomers, an effective amount of an initiator and optionally one or more non-reactive diluents and/or additives, on the concave interface surface of a matched lens pair and moving the concave interface surface and the convex interface surface of the corresponding lens toward each other, thereby spreading the curable adhesive composition between the lenses. The curable ICP composition is then cured via exposure to a suitable energy source. Curing of the polymer places an ion-conducting polymer between the lenses while bonding the lenses into a laminate, thereby facilitating necessary ion flow.

After lamination, the laminated electrochromic device, preferably an electrochromic eyewear lens, comprises an ion-conducting material, preferably an ion-conducting polymer, sandwiched between two coated substrates. Absent an edge seal, the ion-conducting material is exposed to the environment along the edge of the laminate. To reduce moisture transfer into or out of this layer, it is desirable to seal the edge of the lens prior to installation into a holding device such as an eyewear frame.

Any sealant which impedes moisture transport, which has suitable adherence characteristics and which is capable of being applied into the edge groove of a laminated electrochromic device can be used in conjunction with the instant method. Curing of the seal may or may not be necessary depending on the material used as the seal. Suitable sealants for sealing the edges of electrochromic devices are epoxy resins, particularly those that adhere readily to glass and/or organic substrates. As used herein, "epoxy resins" refer to those resins characterized by the presence of an epoxy or oxirane ring. Such resins may contain aliphatic, cycloaliphatic or aromatic backbones. Though cure times and temperatures are not critical to the instant invention, preferred epoxies have cure times of about 0.5 min. to about 24 hours, and are cured at temperatures between about 40° F. and 100° F. (4.4° C. and 149° C.). These epoxies provide an impediment to moisture ingress and egress and impart structural integrity to laminated devices.

Typically, epoxies are formed by combining a resin component with a hardener. Relative to the instant method, the hardener and resin are preferably mixed immediately prior to application into the edge trough. A suitable epoxy for use as a sealant in the instant method is Araldite® 2012, which is commercially available from Ciba Geigy.

The cross-sectional profile of the edge seal generally conforms to the shape of the depression or groove formed in the device edge. The shape of the groove is not believed to be critical. V-shaped grooves are preferred because they are easily formed using a beveled edger on each of the substrates forming a matched laminated pair. In the case of electrochromic lenses, the profile of the seal should not interfere with attachment of the lenses to a suitable frame.

Techniques for forming edge grooves as required by the instant method are well known in the lens edging art, and do not form part of this invention. Edge grooves can be cut before or after lamination. Pre-lamination grooves can be cut by forming a complimentary half groove on each of the mating edges of substrates to be laminated. Conventional edging techniques can be used to form such half grooves.

The best mode known to the inventors is now described by reference to FIG. 1, which shows a partial cross-section of a sealed laminated lens containing an ion-conducting polymer (ICP) layer. This drawing is enlarged to show detail and is not drawn to scale.

In FIG. 1, coated substrate 1 is the front, e.g. plano, lens of a laminated lens. This front lens 1 has a front expanse surface 3 and a rear mating surface 4, which is preferably coated. Coatings on rear mating surface 4 are not shown; these are conventional electroconductive and electrochromic coatings used in the preparation of electrochromic lenses as described herein above and are not critical to the instant invention. Laminated to substrate 1 is substrate 2, which is the rear lens. Rear lens 2 has a front mating surface 5, which is preferably coated, and a rear expanse surface (not shown). Coatings on surface 5 are not shown; these are conventional electroconductive and electrochromic coatings used in the preparation of electrochromic lenses and are not critical to the instant invention. An ion-conducting polymer layer 6 is disposed between substrates 1 and 2; this layer serves as both an ion-conducting electrolyte and a mechanical adhesive which bonds substrates 1 and 2. On the edge region of laminated lens 7, a portion 8 of the ion-conducting polymer layer 6 is exposed, absent edge seal 9.

Following lamination, it is desirable to maintain the water content of ICP 6 near its original water content to maintain required ionic conductivity. Thus, it is desirable to restrict water ingress and egress through the edge region of the device by sealing the exposed portion 8 of ICP layer 6 on the edge region/surface of laminated device 7. The initial water content of the ion-conducting polymer generally depends on the ion-conducting polymer used to laminate the device being sealed and is not critical to the instant invention.

Edge seal 9 is formed by cutting substrates 1 and 2 so as to form a groove in the edge region of laminated lens 7 that is aligned with the exposed portion 8 of ICP layer 6. Thus, the exposed portion 8 of ICP layer 6 is within the groove. Any means suitable for cutting one or both of the circumferential mating edges of substrates 1 and 2 can be used. Conventional edging techniques known in the lens shaping art are acceptable. The bevels 11 form a V-shaped groove on the circumferential edge region of device 7.

The groove is preferably cut by edging substrates 1 and 2 prior to application of their respective coatings and prior to lamination. Thus the mating surfaces of substrates 1 and 2 are beveled using a conventional edger so as to form half of a V-groove on each substrate. Suitable bevels can be made on substrates 1 and 2 separately or bevels can be cut on these substrates simultaneously while they are held together via a suitable coupling means. When laminated, the individual bevels form the V groove shown in FIG. 1.

After lamination of substrates 1 and 2, a sealant 9, preferably an epoxy sealant such as Araldite® 2012, is applied to the groove formed by the beveled edges. Hardener/resin mixing and application of the epoxy are accomplished by means well known in the art. For example, hardener and resin can be combined in a mixing apparatus and then exuded or troweled into the groove. The sealant 9 is applied around the periphery of the device 7. The sealant is then cured, if necessary, resulting in an edge-sealed device.

Current may be delivered to electrochromic lenses via wires or tabs 10. The tabs generally connect to bus bars (not shown), which are low electrical resistance strips that are in electrical contact with the electroconductive layers of an electrochromic device. Each tab 10 must pass through or around seal 9 in order to establish electrical contact between a power supply and the bus bar that it is connected to. This may be accomplished by applying sealant 9 over tabs 10 affixed to bus bars deposited on substrates 1 and 2 prior to sealing, as shown in FIG. 1.

EXAMPLES

The following examples are presented for illustrative purposes only and are not intended to limit the invention in any way.

Example 1

Preparation of a Grooved Electrochromic Device Containing an Ion-Conducting Polymer Layer An electrochromic lens having a circumferential edge groove aligned with its ion-conducting polymer layer was constructed by a cast-in-place technique as described below. The priming, cleaning, coating, bus bar, electrical connector, charging, ion-conducting polymer and laminating aspects of this example are not part of the instant invention.

Each of a matched pair of plastic substrates, polymerized from CR-39® monomer and primed with an organo silane hardcoat, was edged using a Santinelli model C291 Accu-lens edger to form a 40° bevel relative to vertical on its circumferential mating edge. The bevel on each part was similar to that shown in FIG. 1. Thus, during the edging process, a beveled wheel was used to shape each substrate so as to form a half V-groove along the circumferential mating edge of each part. The depth of the V groove was 2 mm.

The edged substrates were cleaned and dried using an ultrasonic cleaning system. After these steps, a chrome-gold bus bar was applied to each of the substrate bevels via a vacuum deposition technique.

Thin films of $In_2O_3:SnO_2$ (ITO) were deposited onto the mating surfaces of the beveled plastic substrates using direct current magnetron sputtering so as to contact each ITO film with its corresponding bus bar. A thin metal strip was then affixed to each bus bar using a conductive epoxy. These strips served as electrical connectors.

Electrochromic layers were separately deposited onto the respective ITO coated plastic substrates. A tungsten oxide thin film was deposited on one substrate by direct current magnetron sputtering, and a nitrogen-containing iridium oxide thin film was deposited on the other substrate by direct current magnetron sputtering.

Following these depositions, the IrOxNy/ITO/primer/polymer substrate was electrochemically charged (reduced) in 0.1 normal aqueous hydrochloric acid (HCl). The $WO_3$/ITO/primer/polymer substrate was not electrochemically treated.

An ion-conducting polymer monomer solution comprising 2-acrylamido-2-methylpropanesulfonic acid (AMPSA) and N,N-dimethylacrylamide (DMA) in 1-methyl-2-pyrrolidinone(NMP) and water and containing an effective amount of a photoinitiator was prepared. This precursor was placed between the $WO_3$ and nitrogen-containing iridium oxide half cells and then exposed to suitable energy to cure the ion-conducting polymer, resulting in a laminated electrochromic device having a circumferential V groove aligned with the ICP layer.

Example 2

Sealing the Electrochromic Device of Example 1

The laminated electrochromic device of Example 1 contained a V-shaped circumferential groove at the interface of its substrates which was aligned with its AMPSA/DMA polymer layer. Araldite® 2012 epoxy sealant was applied to the groove by exuding it from an epoxy dispenser and then troweling to level the sealant with the apexes of the lens substrates. The epoxy was then allowed to cure, resulting in an edge-sealed device. The electrical contacts protruded through the seal along the beveled edges forming the V groove.

We claim:

1. A method for sealing the circumferential edge region of a laminated electrochromic device comprising first and second substrates and an ion-conducting material layer disposed between said first and second substrates, said method comprising: a) cutting, edging, molding or shaping at least one of said substrates so as to form a groove in the circumferential edge region of said laminated electrochromic device; and b) applying a sealant to said groove, thereby causing said sealant to contact said ion-conducting material layer.

2. The method of claim 1, wherein said device is an electrochromic lens.

3. The method of claim 1, wherein the outer surfaces of each of said first and second substrates are cut, edged, molded or shaped so as to form a symmetrical groove in said circumferential edge region.

4. The method of claim 3, wherein said symmetrical groove is V-shaped.

5. The method of claim 4, wherein said groove is made by edging each of said substrates so as to form matching beveled surfaces.

6. The method of claim 1, wherein cutting, edging, molding or shaping occurs prior to lamination of said substrates.

7. The method of claim 6, wherein said first and second substrates are eyewear lenses.

8. The method of claim 2, wherein said first and second substrates are eyewear lenses.

9. The method of claim 1, wherein at least one bus bar is disposed in said groove.

10. A method for sealing the circumferential edge region of a laminated electrochromic device, wherein said circumferential edge region comprises the outer peripheral surfaces of first and second substrates and the outer peripheral surface of an ion-conducting material layer, said method comprising: a) cutting, edging, molding or shaping the outer peripheral surface of at least one of said substrates so as to form a groove in the circumferential edge region of said laminated electrochromic device which is contiguous with the outer peripheral surface of said ion-conducting material layer; and b) applying a sealant to said groove.

11. The method of claim 10, wherein said device is an electrochromic lens.

12. The method of claim 10, wherein the outer surfaces of each of said first and second substrates are cut, edged, molded or shaped so as to form a symmetrical groove in said circumferential edge region.

13. A laminated electrochromic device comprising an ion-conducting material layer disposed between a first substrate and a second substrate, said device having a circumferential edge region characterized by a groove containing a sealant in contact with said ion-conducting material layer, wherein said groove is formed by cutting, edging, molding or shaping at least one of said substrates.

14. The device of claim 13, wherein said first and second substrates are eyewear lenses.

15. The device of claim 13, wherein said groove is formed by cutting, edging, molding or shaping each of said substrates.

16. The device of claim 14, wherein said groove is formed by cutting, edging, molding or shaping each of said lenses.

17. The device of claim 15, wherein said groove is made by edging each of said substrates so as to form matching beveled surfaces.

18. The device of claim 13, wherein said groove is V-shaped.

19. The device of claim 13, wherein at least one bus bar is disposed in said groove.

20. The device of claim 14, wherein at least one bus bar is disposed in said groove.

21. A laminated electrochromic lens comprising an ion-conducting polymer layer disposed between the mating surfaces of first and second eyewear lenses, said laminated electrochromic lens having an edge region prone to moisture gain or loss through the outer peripheral surface of said ion-conducting polymer layer, wherein said edge region contains a groove formed by cutting, edging, molding or shaping at least one of said eyewear lenses, wherein said groove is positioned so as to locate the outer peripheral surface of said ion-conducting polymer layer within said groove and wherein said groove contains a sealant in contact with the outer peripheral surface of said ion-conducting polymer layer.

22. The electrochromic lens of claim 21, wherein said ion-conducting polymer is an ionomer.

23. The electrochromic lens of claim 21, wherein said ion-conducting polymer is an AMPSA homopolymer or copolymer.

* * * * *